United States Patent
Mitchell et al.

(10) Patent No.: US 12,163,458 B2
(45) Date of Patent: Dec. 10, 2024

(54) NON-PRESSURIZED COOLANT RESERVOIR AND CAP

(71) Applicant: FORD GLOBAL TECHNOLOGIES, LLC, Dearborn, MI (US)

(72) Inventors: Robert Alex Mitchell, Plymouth, MI (US); Arindam Basu, Canton, MI (US); Erik Thomas Andersen, Northville, MI (US); Charles Wyman, Canton, MI (US); Michael Joseph Giunta, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 224 days.

(21) Appl. No.: 17/724,996

(22) Filed: Apr. 20, 2022

(65) Prior Publication Data
US 2023/0339363 A1    Oct. 26, 2023

(51) Int. Cl.
*F01P 11/02* (2006.01)
*B60L 58/26* (2019.01)
*B65D 43/02* (2006.01)

(52) U.S. Cl.
CPC ............. *F01P 11/029* (2013.01); *B60L 58/26* (2019.02); *B65D 43/022* (2013.01); *F01P 2011/0228* (2013.01)

(58) Field of Classification Search
CPC .. F01P 11/029; F01P 2011/0228; B60L 58/26; B65D 43/022
See application file for complete search history.

(56) References Cited

U.S. PATENT DOCUMENTS

| | | | | |
|---|---|---|---|---|
| 5,680,833 | A | * 10/1997 | Smith | .................... F01P 11/029 165/104.32 |
| 6,216,646 | B1 | 4/2001 | Smith et al. | |
| 8,966,917 | B2 | * 3/2015 | O'Rourke | .......... H05K 7/20927 62/503 |
| 2005/0252791 | A1 | * 11/2005 | Pechtold | ........... H01M 8/04044 206/1.5 |
| 2007/0175418 | A1 | 8/2007 | Prince et al. | |
| 2007/0215073 | A1 | * 9/2007 | Lawrence | .............. F01P 11/028 123/41.54 |
| 2017/0183131 | A1 | * 6/2017 | Kishore Kumar | ..... B65D 51/16 |

FOREIGN PATENT DOCUMENTS

| | | |
|---|---|---|
| DE | 102007054855 A1 | 5/2009 |
| GB | 2452070 A | 2/2009 |

* cited by examiner

*Primary Examiner* — Syed O Hasan
(74) *Attorney, Agent, or Firm* — Vincent Mastrogiacomo; Brooks Kushman P.C.

(57) ABSTRACT

A non-pressurized fluid reservoir for a vehicle coolant system includes a bottle configured to store fluid. The bottle has a neck defining an inner circumferential surface that is devoid of threads. The reservoir further includes a cap having a lid and a shank extending from the lid. The shank has an outer circumferential surface and with a spiral ramp supported on the outer circumferential surface to encircle a portion of the shank. The shank is receivable within the neck with the spiral ramp adjacent to the inner circumferential surface to mitigate fluid leaks through the neck.

16 Claims, 4 Drawing Sheets

NON-PRESSURIZED COOLANT RESERVOIR AND CAP

TECHNICAL FIELD

This disclosure relates to vehicle coolant systems and more particularly to a non-pressurized coolant reservoir.

BACKGROUND

Electrified vehicles are one type of vehicle. In general, electrified vehicles differ from conventional motor vehicles in that they are selectively driven by one or more battery powered electric machines. Many electrified vehicles include thermal management systems that mange the thermal demands of various components during vehicle operation, including the vehicle's high-voltage traction battery. Some thermal management systems provide active heating or active cooling of the battery pack as part of a liquid-cooled system. Liquid-cooled systems may include a coolant reservoir.

SUMMARY

According to one embodiment, a non-pressurized fluid reservoir for a vehicle coolant system includes a bottle configured to store fluid. The bottle has a neck defining an inner circumferential surface that is devoid of threads. The reservoir further includes a cap having a lid and a shank extending from the lid. The shank has an outer circumferential surface and with a spiral ramp supported on the outer circumferential surface to encircle a portion of the shank. The shank is receivable within the neck with the spiral ramp adjacent to the inner circumferential surface to mitigate fluid leaks through the neck.

According to another embodiment, a non-pressurized vehicle cooling system includes a coolant loop and a bottle in fluid communication with the coolant loop. The bottle has a neck defining an inner circumferential surface that is devoid of threads. A cap has a lid and a shank extending from the lid. The shank has an outer circumferential surface and has a spiral ramp supported on the outer circumferential surface to encircle a portion of the shank. The shank is receivable within the neck with the spiral ramp adjacent to the inner circumferential surface to mitigate fluid leaks through the neck.

According to yet another embodiment, a non-pressurized fluid reservoir for a vehicle coolant system includes a bottle configured to store fluid. The bottle has a top defining a neck and a sidewall joined to the top by a rolled edge configured to redirect fluid downwardly, wherein a top portion of the rolled edge is higher than an upper most portion of the top. A cap is connectable to the neck such that an interior of the bottle is in fluid communication with the atmosphere.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
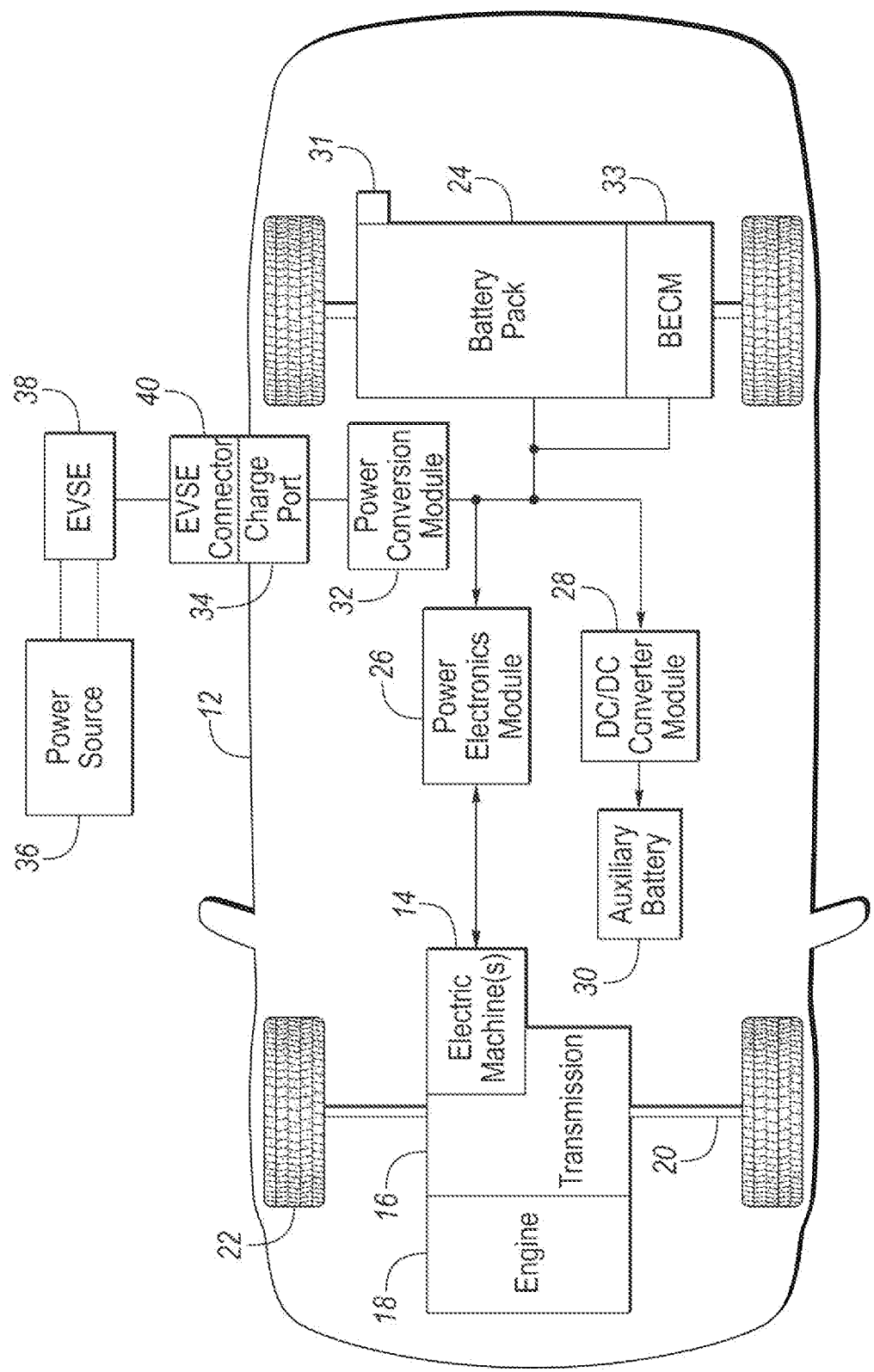
FIG. 1 illustrates a schematic of a hybrid electric vehicle.

FIG. 1 depicts a schematic of an example plug-in hybrid-electric vehicle (PHEV). Certain embodiments, however, may also be implemented within the context of non-plug-in hybrids and fully electric vehicles. The vehicle 12 includes one or more electric machines 14 mechanically connected to a hybrid transmission 16. The electric machines 14 may be capable of operating as a motor or a generator. In addition, the hybrid transmission 16 may be mechanically connected to an engine 18. The hybrid transmission 16 may also be mechanically connected to a drive shaft 20 that is mechanically connected to the wheels 22. The electric machines 14 can provide propulsion and deceleration capability when the engine 18 is turned on or off. The electric machines 14 also act as generators and can provide fuel economy benefits by recovering energy through regenerative braking. The electric machines 14 reduce pollutant emissions and increase fuel economy by reducing the work load of the engine 18.

A traction battery or battery pack 24 stores energy that can be used by the electric machines 14. The traction battery 24 typically provides a high voltage direct current (DC) output from one or more battery cell arrays, sometimes referred to as battery cell stacks, within the traction battery 24. The battery cell arrays may include one or more battery cells.

The traction battery 24 may be electrically connected to one or more power electronics modules 26 through one or more contactors (not shown). The one or more contactors isolate the traction battery 24 from other components when opened and connect the traction battery 24 to other components when closed. The power electronics module 26 may be electrically connected to the electric machines 14 and may provide the ability to bi-directionally transfer electrical energy between the traction battery 24 and the electric machines 14. For example, a typical traction battery 24 may provide a DC voltage while the electric machines 14 may require a three-phase alternating current (AC) voltage to function. The power electronics module 26 may convert the DC voltage to a three-phase AC voltage as required by the electric machines 14. In a regenerative mode, the power electronics module 26 may convert the three-phase AC voltage from the electric machines 14 acting as generators to the DC voltage required by the traction battery 24. The description herein is equally applicable to a fully-electric vehicle. In a fully-electric vehicle, the hybrid transmission 16 may be a gear box connected to an electric machine 14 and the engine 18 is not present.

In addition to providing energy for propulsion, the traction battery 24 may provide energy for other vehicle electrical systems. A typical system may include a DC/DC converter module 28 that converts the high voltage DC output of the traction battery 24 to a low voltage DC supply that is compatible with other vehicle components. Other high-voltage loads, such as compressors and electric heaters, may be connected directly to the high-voltage supply without the use of a DC/DC converter module 28. In a typical vehicle, the low-voltage systems are electrically connected to an auxiliary battery 30 (e.g., a 12 volt battery).

A battery energy control module (BECM) 33 may be in communication with the traction battery 24. The BECM 33 may act as a controller for the traction battery 24 and may also include an electronic monitoring system that manages temperature and charge state of each of the battery cells. The traction battery 24 may have a temperature sensor 31 such as a thermistor or other temperature gauge. The temperature sensor 31 may be in communication with the BECM 33 to provide temperature data regarding the traction battery 24.

The vehicle 12 may be recharged by an external power source 36. The external power source 36 may be an electric power grid. The external power source 36 is electrically connected to electric vehicle supply equipment (EVSE) 38. The EVSE 38 may provide circuitry and controls to manage the transfer of electrical energy between the power source 36 and the vehicle 12. The external power source 36 may provide DC or AC electric power to the EVSE 38. The EVSE 38 may have a charge connector 40 for plugging into a charge port 34 of the vehicle 12. The charge port 34 may be any type of port configured to transfer power from the EVSE 38 to the vehicle 12. The charge port 34 may be electrically connected to a charger or on-board power conversion module 32. The power conversion module 32 may condition the power supplied from the EVSE 38 to provide the proper voltage and current levels to the traction battery 24. The power conversion module 32 may interface with the EVSE 38 to coordinate the delivery of power to the vehicle 12. The EVSE connector 40 may have pins that mate with corresponding recesses of the charge port 34. In some embodiments, the vehicle may be wirelessly charged via an induction charging system.

The vehicle 12 may have a plurality of different charging modes depending upon the type and power capacity of the EVSE 38. For example, the vehicle 12 may have a slow-charging mode that is used when the EVSE 38 is a 110 volts power source. The vehicle 12 may have another charging mode that is used when the EVSE 38 is a 220 volts power source. The vehicle 12 may also have a fast-charging mode that is used when the power source is a 300 plus volts power source. The EVSE 38 may be capable of preforming fast charge or another charging station may be used. The fast-charging mode may be a DC charging mode. The higher-voltage charging modes allow the vehicle to be charged faster because a higher amount of current is being supplied to the battery cells. Because of the higher current, more heat is produced during the higher voltage charging modes. In some of the charging modes, such as fast charge, the batteries must be actively cooled to prevent overheating.

The various components discussed may have one or more controllers to control and monitor the operation of the components. The controllers may communicate via a serial bus (e.g., Controller Area Network (CAN)) or via dedicated electrical conduits. The controller generally includes any number of microprocessors, ASICs, ICs, memory (e.g., FLASH, ROM, RAM, EPROM and/or EEPROM) and software code to co-act with one another to perform a series of operations. The controller also includes predetermined data, or "look up tables" that are based on calculations and test data, and are stored within the memory. The controller may communicate with other vehicle systems and controllers over one or more wired or wireless vehicle connections using common bus protocols (e.g., CAN and LIN). Used herein, a reference to "a controller" may refer to one or more controllers.

Figure 2:
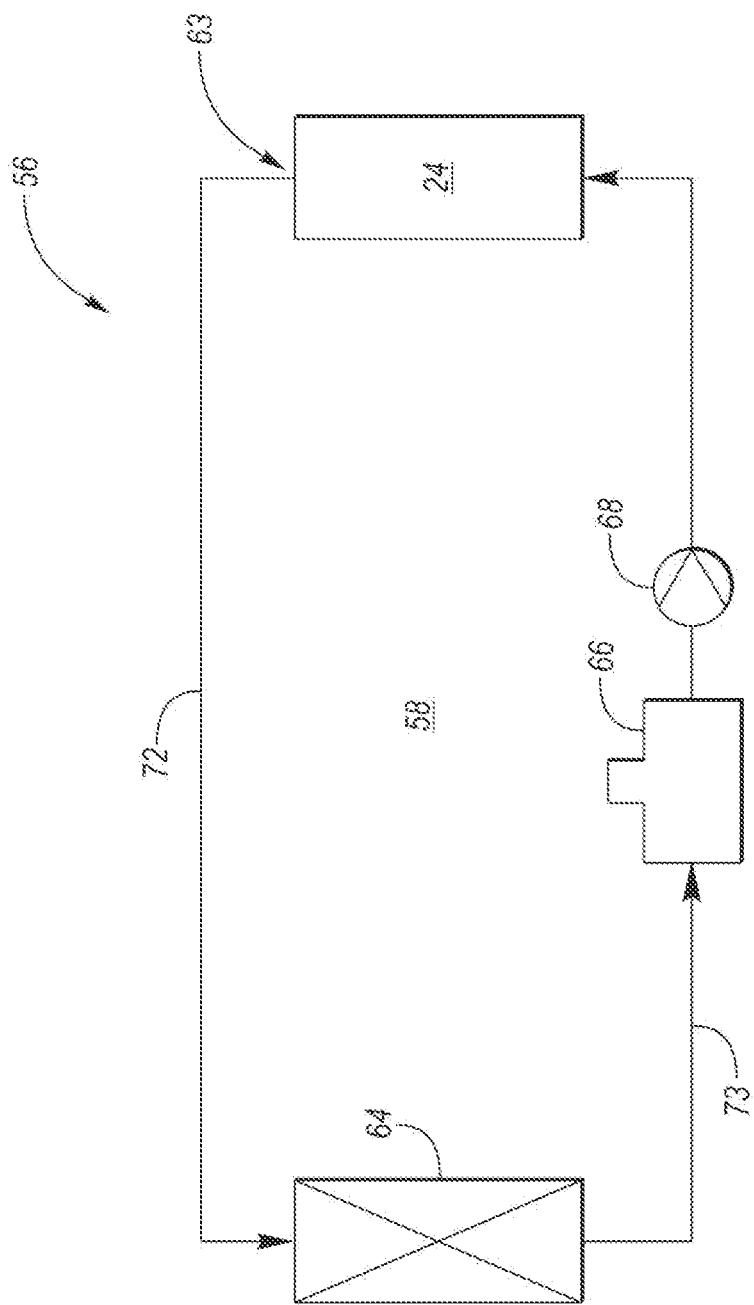
FIG. 2 illustrates a schematic diagram of a thermal-management system.

Referring to FIG. 2, the example vehicle 12 includes a thermal management system 56. The thermal management system 56 can be employed to manage thermal loads generated by various vehicle components, such as the battery assembly 24, powertrain components, and power-electronic components. For example, the thermal management system 56 can selectively circulate coolant to the battery assembly 24 to either cool or heat the battery assembly depending on operating conditions.

In one embodiment, the thermal management system 56 includes a coolant subsystem 58 and may also include a refrigerant subsystem (not shown). The coolant subsystem 58, or coolant loop, circulates coolant through the battery assembly 24. The coolant may be a conventional type of coolant mixture, such as water mixed with ethylene glycol. Other coolants could also be used by the thermal management system 56. The coolant subsystem 58 may include a radiator 64, a reservoir 66, a pump 68, the battery 24, and a chiller (if provided). Additional components may also be employed by the coolant subsystem 58.

In operation, warm coolant may exit an outlet 63 of the battery 24. The warm coolant is circulated to the radiator 64 via line 72. The warm coolant is cooled within the radiator 64 by airflow traveling across the fins to effectuate heat transfer between the airflow and the warm coolant. Cooled coolant exits the radiator 64 and enters line 73 for recirculation to the reservoir 66.

Traditionally, engine-cooling systems were pressurized to suppress boiling of the coolant due to the hot temperatures associated with internal-combustion engines. Thus, the reservoirs of engine-cooling systems have sealing features configured to maintain system pressure. These features add expense to the reservoir.

In contrast, battery-cooling systems operate at much lower temperatures where boiling-point suppression is unnecessary. As such, the coolant reservoir 66 of battery cooling systems 58 does not require pressurization, and the reservoir does not require the expensive sealing features that are required of pressurized reservoirs. While the battery-cooling system reservoirs are not required to maintain pressurization, they still must prevent the leaking of coolant and the ingress of contaminants. Disclosed herein are one or more embodiments of a non-pressurized coolant reservoir having price-efficient features for suppressing coolant leakage and the ingress of contaminants.

Figure 3:
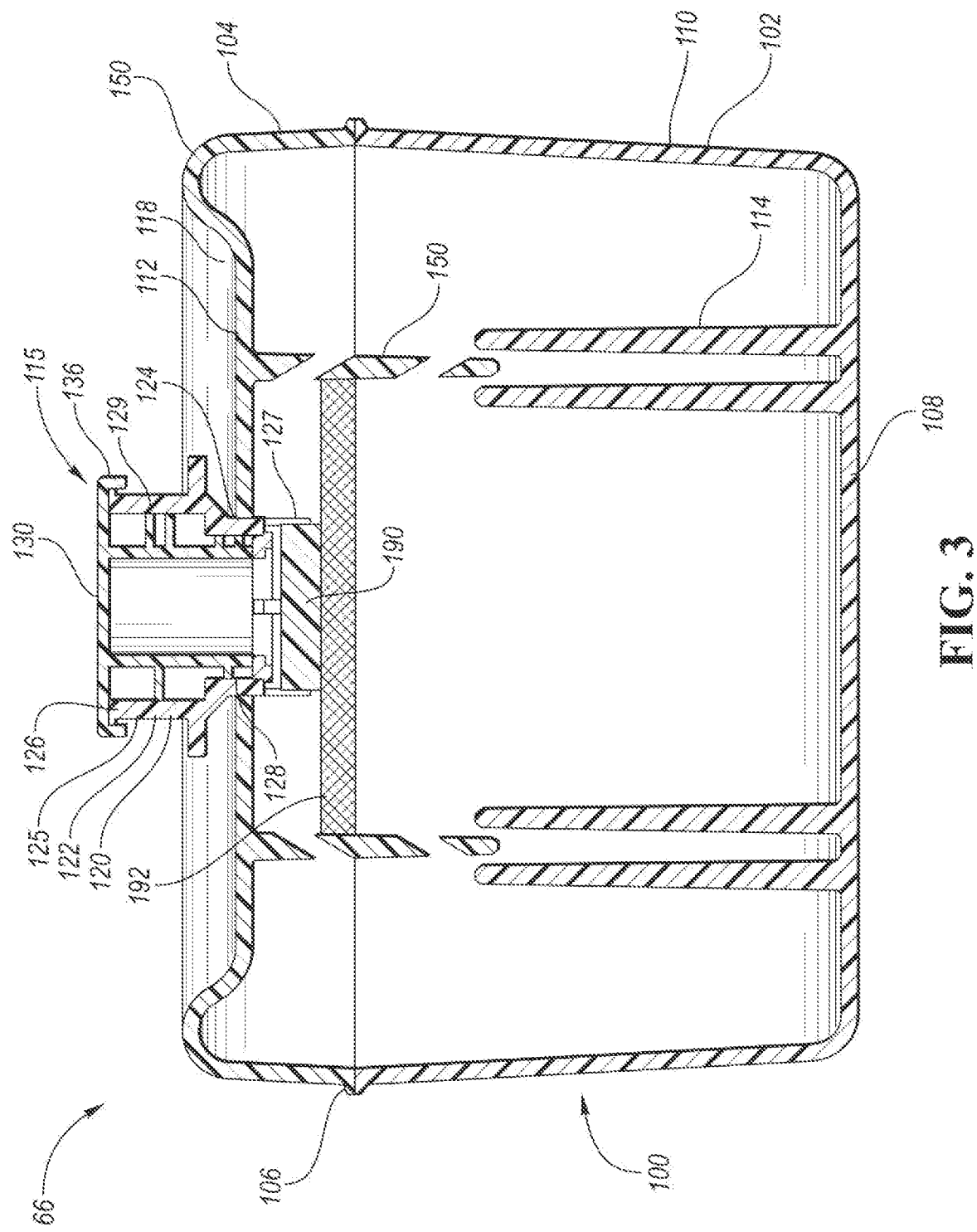
FIG. 3 illustrates a side view, in cross section, of a non-pressurized coolant reservoir and cap.
Figure 4:
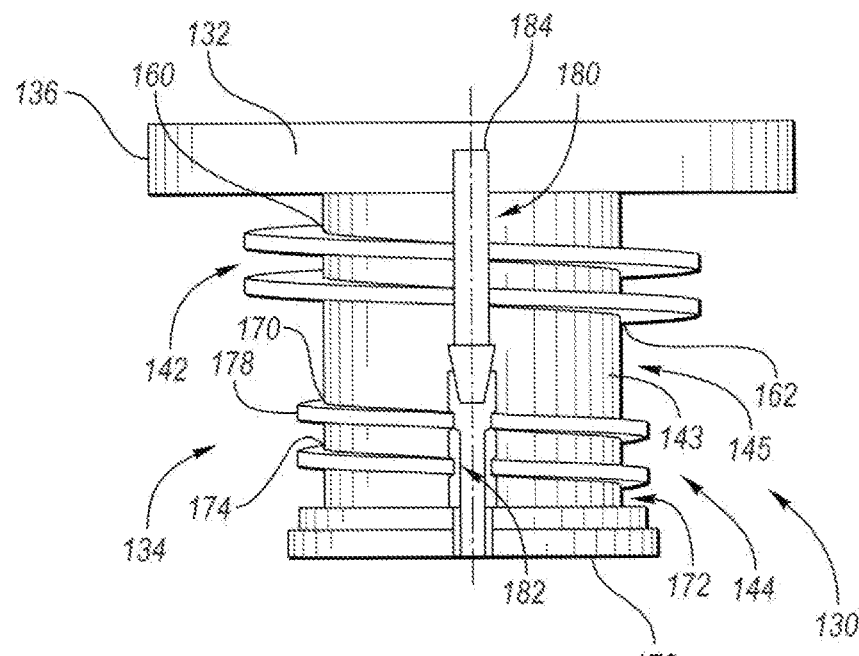
FIG. 4 illustrates a side view of the cap.

Referring to FIGS. 3 and 4, the fluid reservoir 66 may be a bottle. The bottle may be formed of plastic. One or more of the to be described component of the bottle may be integrally formed with each other or separately formed and assembled. The bottle 66 is configured to store coolant of the battery cooling system 58. The bottle 66 may have a lower housing portion 102 an upper housing portion 104 that are joined at a flange 106. The housing portions 102, 104 may be formed of plastic or other suitable material. The bottle 66 includes a bottom 108, sidewalls 110, and a top 112. One or more of the bottom 108 and sidewalls 110 define openings or ports (not shown) for connecting to conduit, e.g., hoses, of the battery-cooling system 58. For example, one of the sidewalls may define an inlet port and another of the sidewalls may define an outlet port. The inlet port and the outlet port may include fittings or the like configured to be received within the conduit. In one embodiment, the fittings are integrally formed features of the bottle 66.

The top 112 defines an opening 115, which may be a circular hole. The filler neck 122 may be a cylindrical, tubular body 120 that extends vertically upward from the top 112 and provides an opening for coolant to be added to the reservoir 66. The filler neck 122 may include a lower portion 124 that is partially disposed within the chamber of the bottle 66 and an upper portion 125 that is external to the bottle 66. The lower portion 124 may define a collar 127 that extends downwardly from the underside of the top 112. The upper portion of the filler neck 122 defines an upper rim 126 that defines the start of a fill port. The tubular body 120 may have multiple diameters. For example, a first sidewall 128 of the filler neck may have a first inner diameter (ID) and a second sidewall 129 may have a second ID that is larger than the first ID. A shoulder portion may extend between the first and second sidewalls. The sidewalls 128 and 129 may be devoid of threads.

A cap 130 closes the opening of the filler neck 122. For example, the cap 130 may be snap fit to the filler neck 122. The cap 130 includes a lid 132, a shank 134 extending downwardly from the lid. The lid 132 may be disc shaped and include a perimeter flange or lip 136 that extends downwardly from the lid 132. The diameter of the flange 136 is larger than the outer diameter of the filler neck 122 so that the flange 136 circumscribes the neck. The shank 134 is configured to be received within the filler neck 122.

The shank 134 may include one or more spiral ramps supported on the outer circumferential surface 143 to encircle a portion of the shank. The spiral ramp(s) includes an inner edge joined to the surface 143 and an outer edge adjacent to the inner circumferential surface of the filler neck to mitigate fluid leaks through the neck. The spiral ramp(s) are sloped such that fluid flows away from the lid 132 and back into the bottle 66. The spiral ramps cooperate with the filler neck 122 to inhibit fluid from exiting the bottle 66 while permitting the bottle 66 to remain at atmospheric pressure. That is, the spiral ramps do not sever fluid communication between the bottle 66 and the atmosphere. The ramp(s) extend at least 360 degrees around the outer circumferential surface 143.

In the illustrated embodiment, a pair of spiral ramps 142 and 144 are used. The ramps 142 and 144 may be discontinuous with an axial space 145 therebetween. The first ramp 142 includes a first end 160 proximal to the lid 132 and a second end 162 distal to the lid. The first ramp 142 further includes an inner edge 164 joined to the circumferential surface 143 and an outer edge 166. The second ramp 144 includes a first end 170 near a middle portion of the shank 134 and a second end 172 near a bottom 176 of the shank. The second ramp 144 further includes an inner edge 174 joined to the circumferential surface 143 and an outer edge 178. The outer diameter of the first ramp 142 is larger than the outer diameter of the second ramp 144 to match the diameters of the filler neck 122.

The shank 134 is received within the filler neck 122 with the outer edge 166 of the first ramp 142 adjacent to the inner diameter of the upper portion 125 and with the outer edge 178 of the second ramp 144 adjacent to the inner diameter of the lower portion 124. The outer edges may or may not touch the filler neck 122 but are close enough to inhibit the flow of coolant. In some embodiments, the ramps do engage with the filler neck. Here, the outer edges 166 and 178 may be feathered (thinned) so that they can deform and seal to the neck 122.

During operation, the outer edges of the ramp(s) mitigate the flow of liquid coolant therethrough to contain the liquid coolant within the tank 66. However, heat may cause the coolant to evaporate into steam that can pass by the edges. The lid 132 is designed to trap the steam, which may then condense on the underside of the lid. The condensed steam may then drip down from the underside of the lid and onto the ramps, which carry the liquid coolant back into the bottle 66 due to the slope of the ramps.

The cap 130 and the filler neck 122 may cooperate to define a fluid channel 180 configured to connect the interior of the tank in fluid communication with the atmosphere. This is an optional feature. The fluid channel 180 may be defined by one or more grooves recessed into the shank 134 or the filler neck 122. In some embodiments, the fluid channel 180 may simply be formed as breaks or cutouts 182 in the ramp(s). As shown in FIG. 4, the pair of ramps each include two breaks that are all axial aligned to form a channel allowing air to pass therethrough in order to fluidly connect the tank in the atmosphere. Also as shown, the flange 136 of the lid 132 defines a slot 184 that is aligned with the breaks 182.

The housing portion 102 may define one or more internal walls 114. The walls 114 may be oriented vertically as shown and may extend across a width or length of the bottle 66. The vertical walls 114 may be used to support or retain objects within the bottle 66 as will be explained in more detail below. The vertical walls 114 may also suppress sloshing of the coolant within the bottle 66. In the illustrated embodiment, four walls 114 are provided, however, this is just an example and more or less may be provided in other embodiments.

Figure 5:
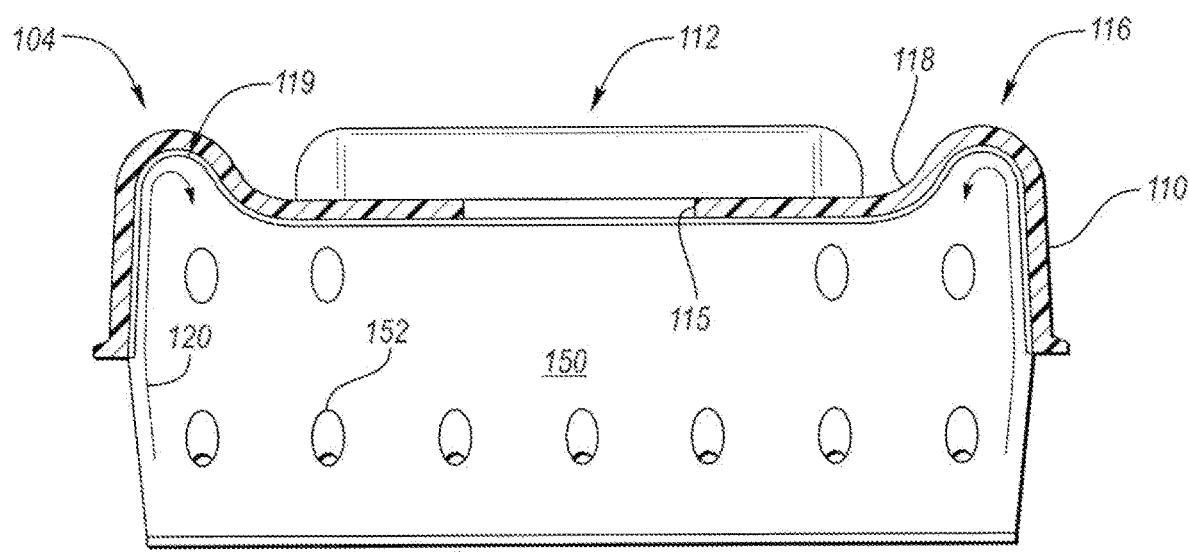
FIG. 5 illustrates a partial side view, in cross section, of the coolant reservoir.

Referring to FIGS. 3 and 5, the upper housing portion 104 may also include anti-splash and/or anti-slosh features. For example, the top 112 may include a rolled edge(s) 116 around the upper perimeter of the bottle 66. The rolled edge 116 joins the upper portions of sidewalls 110 and the top wall 118. The rolled edge 116 includes a radius configured to redirect splashing or sloshed coolant downwardly as shown by the arrows 121. That is, the rolled edge 116 forms a pocket 119 raised above the top 112 that is shaped to redirect coolant downwardly. The rolled edge 116 may be formed around the complete perimeter of the bottle 66 or only select portions (as shown).

The upper housing portion 104 may also include an associated baffle(s) 150. The baffle(s) 150 may extend downwardly from the top 112. In the illustrated embodiment, a pair of baffles 150 are used. Here, the baffles are rectangular walls that extend between two opposing ones of the sidewalls 110. Alternatively, the baffle 150 could be a circular or square component that circumscribes the opening 115. The baffles 150 define a plurality of holes 152 that allow coolant to flow therethrough. The baffles 150 impede movement of the fluid to reduce sloshing and splashing within the bottle 66. In the illustrated example, the baffles 150 are aligned with the walls 114 such that each baffle 150 is received within a gap defined between a pair of the vertical walls 114 as best shown in FIG. 3.

The bottle 66 may also include one or more porous mediums disposed in the chamber of the bottle and extending over the opening 115 to suppress fluid flow from the tank into the neck 122. In some embodiments, the porous medium may be disposed within the neck. In others, the porous medium is disposed below the neck and is attached to the baffles 150. FIG. 3 shows two porous mediums for illustrative purposes but is to be understood that only one of these porous mediums may be included in one or more embodiments. In some embodiments, both porous mediums may be included. The porous mediums may be a mesh screen, filter paper, or any other material capable of having liquid coolant poured therethrough but resisting splashing back through.

As shown in FIG. 3, a porous medium 190, such as a mesh screen, is disposed in the lower portion 124 of the filler neck 122. The porous medium 190 may be disc shaped to completely fill filler neck at that location. A second porous medium 192 is disposed within the chamber of the bottle 66 below the collar 127 of the filler neck and is configured to span over the collar. Of course, the embodiment of FIG. 3 may only include one of these porous mediums.

For purposes of illustration and description, the above-described bottle 66 includes many features cooperating to reduce the leaking of coolant while maintaining fluid communication between the interior of the bottle and the atmosphere. It is to be understood, that in other embodiments, not all of these features have to be employed in a single implementation and that only some of these features may be required alone or in different combinations to provide a satisfactory fluid reservoir. Some embodiments may only include some of these features. Of course, other embodiments may include all of these features as generally shown and described above.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to strength, durability, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A non-pressurized fluid reservoir for a vehicle coolant system comprising: a bottle configured to store fluid, the bottle having a neck defining an inner circumferential surface that is devoid of threads; and a cap having a lid and a shank extending from the lid, the shank having an outer circumferential surface and having a spiral ramp, wherein the spiral ramp includes a first end proximal to the lid and a second end distal to the lid, the spiral ramp supported on the outer circumferential surface to encircle a portion of the shank, wherein the shank is receivable within the neck with the spiral ramp disposed against the neck and adjacent to the inner circumferential surface to mitigate fluid leaks through the neck.

2. The fluid reservoir of claim 1, wherein the ramp extends at least 360 degrees around the outer circumferential surface.

3. The fluid reservoir of claim 1, wherein the shank further has a second spiral ramp supported on the outer circumferential surface to encircle a portion of the shank, wherein the second spiral ramp is discontinuous with and axially spaced from the spiral ramp.

4. The fluid reservoir of claim 3, wherein the spiral ramp has a larger outer diameter than the second spiral ramp.

5. The fluid reservoir of claim 4, wherein the neck defines a second inner circumferential surface that is devoid of threads and that has an inner diameter that is smaller than an inner diameter of the inner circumferential surface, and wherein the spiral ramp is disposed in the inner circumferential surface and the second spiral ramp is disposed in the second inner circumferential surface.

6. The fluid reservoir of claim 1, wherein the cap and the neck cooperate to define an air channel that places the bottle in fluid communication with the atmosphere.

7. The fluid reservoir of claim 1, wherein the bottle defines a top and the neck has a collar that extends downwardly from the top and into an interior of the bottle.

8. The fluid reservoir of claim 1 further comprising a porous medium disposed in the bottle and extending over an end of the neck to suppress fluid flow from the bottle into the neck.

9. The fluid reservoir of claim 8, wherein the porous medium is mesh.

10. The fluid reservoir of claim 1, wherein the bottle includes a top interconnected to a sidewall by a rolled edge configured to redirect fluid downwardly.

11. The fluid reservoir of claim 10, wherein a top portion of the rolled edge is higher than an upper most portion of the top.

12. The fluid reservoir of claim 1, wherein the bottle defines a top interconnected to a sidewall by a rolled edge configured to redirect fluid downwardly, and the neck has a collar that extends downwardly from the top and into an interior of the bottle, and further comprising:
a porous medium disposed in the bottle and extending over an end of the neck to suppress fluid flow from the bottle into the neck; and
a baffle disposed in the bottle.

13. A non-pressurized vehicle cooling system comprising: a coolant loop; a bottle in fluid communication with the coolant loop, the bottle having a neck and a porous medium that extends over an end of the neck to suppress fluid flow from the bottle into the neck, wherein the neck defines an inner circumferential surface that is devoid of threads; and a cap having a lid and a shank extending from the lid, the shank having an outer circumferential surface and having a spiral ramp supported on the outer circumferential surface to encircle a portion of the shank, wherein the shank is receivable within the neck with the spiral ramp adjacent to the inner circumferential surface to mitigate fluid leaks through the neck.

14. The vehicle cooling system of claim 13, wherein the spiral ramp is disposed against the neck.

15. A non-pressurized fluid reservoir for a vehicle coolant system comprising:
a bottle configured to store fluid, the bottle having a top defining a neck and a sidewall joined to the top by a rolled edge configured to redirect fluid downwardly, wherein the rolled edge is formed around the complete perimeter of the bottle, and a top portion of the rolled edge is higher than an upper most portion of the top; and
a cap connectable to the neck such that an interior of the bottle is in fluid communication with the atmosphere, wherein the neck defines an inner circumferential surface that is devoid of threads, and wherein the cap has a lid and a shank extending from the lid, the shank having an outer circumferential surface and having a spiral ramp supported on the outer circumferential surface to encircle a portion of the shank, wherein the shank is receivable within the neck with the spiral ramp adjacent to the inner circumferential surface to mitigate fluid leaks through the neck.

16. The fluid reservoir of claim 15, wherein the rolled edge is formed around the complete perimeter of the bottle.

* * * * *